United States Patent
Hoydick et al.

(10) Patent No.: US 10,385,419 B2
(45) Date of Patent: Aug. 20, 2019

(54) HIGH STRENGTH STEEL PRODUCTS AND ANNEALING PROCESSES FOR MAKING THE SAME

(71) Applicant: UNITED STATES STEEL CORPORATION, Pittsburgh, PA (US)

(72) Inventors: David Paul Hoydick, Pittsburgh, PA (US); Eduardo Augusto Silva, Murrysville, PA (US); Matthew Michael McCosby, New Castle, PA (US)

(73) Assignee: United States Steel Corporation, Pittsburgh, PA (US)

(*) Notice: Subject to any disclaimer, the term of this patent is extended or adjusted under 35 U.S.C. 154(b) by 13 days.

(21) Appl. No.: 15/591,344

(22) Filed: May 10, 2017

(65) Prior Publication Data
US 2017/0327924 A1 Nov. 16, 2017

Related U.S. Application Data

(60) Provisional application No. 62/334,189, filed on May 10, 2016, provisional application No. 62/396,602, filed on Sep. 19, 2016.

(51) Int. Cl.
*C21D 9/46* (2006.01)
*B32B 15/01* (2006.01)
(Continued)

(52) U.S. Cl.
CPC .............. *C21D 9/46* (2013.01); *B32B 15/013* (2013.01); *B32B 15/043* (2013.01); *B32B 15/18* (2013.01);
(Continued)

(58) Field of Classification Search
CPC .............. B32B 15/18; C21D 1/20; C21D 1/22
(Continued)

(56) References Cited

U.S. PATENT DOCUMENTS

| 669,925 A | 3/1901 | Hibbard |
|---|---|---|
| 4,165,964 A | 8/1979 | Yonezawa et al. |

(Continued)

FOREIGN PATENT DOCUMENTS

| EP | 1365037 A1 | 11/2003 |
|---|---|---|
| JP | S5891130 A | 5/1983 |

(Continued)

OTHER PUBLICATIONS

International Search Report and Written Opinion of the International Searching Authority for Application No. PCT/US2017/031938, 20 pages.

(Continued)

*Primary Examiner* — Jie Yang
(74) *Attorney, Agent, or Firm* — Alan G. Towner; Leech Tishman Fuscaldo & Lampl

(57) ABSTRACT

The present invention provides steel sheet products having controlled compositions that are subjected to two-step annealing processes to produce sheet products having desirable microstructures and favorable mechanical properties such as high strength and ultra-high formability. Steels processed in accordance with the present invention exhibit combined ultimate tensile strength and total elongation (UTS·TE) properties of greater than 25,000 MPa-%. Steels with these properties fall into the category of Generation 3 advanced high strength steels, and are highly desired by various industries including automobile manufacturers.

26 Claims, 13 Drawing Sheets

(51) Int. Cl.

| | | |
|---|---|---|
| *B32B 15/04* | (2006.01) | |
| *B32B 15/18* | (2006.01) | |
| *C21D 8/02* | (2006.01) | |
| *C22C 38/02* | (2006.01) | |
| *C22C 38/04* | (2006.01) | |
| *C22C 38/06* | (2006.01) | |
| *C22C 38/12* | (2006.01) | |
| *C22C 38/14* | (2006.01) | |
| *C23C 2/06* | (2006.01) | |
| *C23C 2/40* | (2006.01) | |
| *C25D 3/22* | (2006.01) | |
| *C25D 5/36* | (2006.01) | |
| *C23C 2/02* | (2006.01) | |
| *C21D 1/25* | (2006.01) | |
| *C21D 1/26* | (2006.01) | |
| *C22C 38/00* | (2006.01) | |
| *C22C 38/08* | (2006.01) | |
| *C22C 38/16* | (2006.01) | |
| *C22C 38/18* | (2006.01) | |
| *C22C 38/40* | (2006.01) | |
| *C22C 38/54* | (2006.01) | |
| *C23C 28/02* | (2006.01) | |
| *C21D 1/78* | (2006.01) | |
| *C21D 1/20* | (2006.01) | |
| *C21D 1/22* | (2006.01) | |

(52) U.S. Cl.
CPC ............ *C21D 1/20* (2013.01); *C21D 1/22* (2013.01); *C21D 1/25* (2013.01); *C21D 1/26* (2013.01); *C21D 1/78* (2013.01); *C21D 8/0247* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/40* (2013.01); *C22C 38/54* (2013.01); *C23C 2/02* (2013.01); *C23C 2/06* (2013.01); *C23C 2/40* (2013.01); *C23C 28/021* (2013.01); *C23C 28/025* (2013.01); *C25D 3/22* (2013.01); *C25D 5/36* (2013.01); *C21D 8/0236* (2013.01); *C21D 8/0278* (2013.01); *C21D 2211/001* (2013.01); *C21D 2211/005* (2013.01); *C21D 2211/008* (2013.01)

(58) Field of Classification Search
USPC ........................................................ 148/518
See application file for complete search history.

(56) References Cited

U.S. PATENT DOCUMENTS

| | | | |
|---|---|---|---|
| 4,561,911 | A | 12/1985 | Tanikawa et al. |
| 5,143,558 | A | 9/1992 | Smith |
| 5,284,680 | A | 2/1994 | Bilimoria |
| 5,411,812 | A | 5/1995 | Bilimoria |
| 5,618,355 | A | 4/1997 | Boyer et al. |
| 5,798,007 | A | 8/1998 | Boyer et al. |
| 6,423,426 | B1 | 7/2002 | Kobayashi et al. |
| 6,464,808 | B2 | 10/2002 | Pasquinet et al. |
| 6,547,898 | B2 | 4/2003 | Mignard et al. |
| 6,558,815 | B1 | 5/2003 | Suzuki et al. |
| 6,869,691 | B2 | 3/2005 | Nagataki et al. |
| 6,911,268 | B2 | 6/2005 | Takada et al. |
| 7,090,731 | B2 | 8/2006 | Kashima et al. |
| 7,267,890 | B2 | 9/2007 | Fujita et al. |
| 7,368,689 | B2 | 5/2008 | Roehr et al. |
| 7,371,294 | B2 | 5/2008 | Miura et al. |
| 7,384,489 | B2 | 6/2008 | Raick et al. |
| 7,455,736 | B2 | 11/2008 | Kashima et al. |
| 7,736,449 | B2 | 6/2010 | Takada et al. |
| 7,824,509 | B2 | 11/2010 | Fujita et al. |
| 7,879,160 | B2 | 2/2011 | Sun |
| 7,919,194 | B2 | 4/2011 | Kawamura et al. |
| 8,075,836 | B2 | 12/2011 | Okada et al. |
| 8,137,487 | B2 | 3/2012 | Nonaka et al. |
| 8,216,397 | B2 | 7/2012 | Fujita et al. |
| 8,241,759 | B2 | 8/2012 | Nakagaito et al. |
| 8,337,643 | B2 | 12/2012 | Sun |
| 8,359,894 | B2 | 1/2013 | Yoshii et al. |
| 8,425,225 | B2 | 4/2013 | Pasquinet et al. |
| 8,430,975 | B2 | 4/2013 | Nakagaito et al. |
| 8,480,819 | B2 | 7/2013 | Futamura |
| 8,679,265 | B2 | 3/2014 | Murakami et al. |
| 8,714,104 | B2 | 5/2014 | Hoshino |
| 8,715,427 | B2 | 5/2014 | Vandeputte et al. |
| 8,741,078 | B2 | 6/2014 | Song et al. |
| 8,815,026 | B2 | 8/2014 | Kaneko et al. |
| 8,834,651 | B2 | 9/2014 | Matsumura et al. |
| 8,840,738 | B2 | 9/2014 | Murakami et al. |
| 8,840,834 | B2 | 9/2014 | Matsuda et al. |
| 8,844,462 | B2 | 9/2014 | Onozawa et al. |
| 8,845,324 | B2 | 9/2014 | Sedmak |
| 8,876,986 | B2 | 11/2014 | Hata et al. |
| 8,876,987 | B2 | 11/2014 | Matsuda et al. |
| 8,911,567 | B2 | 12/2014 | Ogawa et al. |
| 8,918,199 | B2 | 12/2014 | Claveroulas et al. |
| 8,932,729 | B2 | 1/2015 | Kawata et al. |
| 8,951,366 | B2 | 2/2015 | Sano et al. |
| 8,951,367 | B2 | 2/2015 | Kawamura et al. |
| 8,986,468 | B2 | 3/2015 | Miura et al. |
| 8,993,120 | B2 | 3/2015 | Kawata et al. |
| 9,028,626 | B2 | 5/2015 | Nakagaito et al. |
| 9,096,918 | B2 | 8/2015 | Taniguchi et al. |
| 9,127,339 | B2 | 9/2015 | Hoshino |
| 9,150,946 | B2 | 10/2015 | Taniguchi et al. |
| 2002/0017747 | A1 | 2/2002 | Sugano et al. |
| 2004/0166360 | A1 | 8/2004 | Imai et al. |
| 2008/0023111 | A1 | 1/2008 | Nakanishi et al. |
| 2008/0175743 | A1 | 7/2008 | Futatsuka et al. |
| 2009/0123651 | A1 | 5/2009 | Okada |
| 2009/0151820 | A1 | 6/2009 | Haji et al. |
| 2009/0158975 | A1 | 6/2009 | Cluzel et al. |
| 2009/0200174 | A1 | 8/2009 | Ishizuka et al. |
| 2009/0315228 | A1 | 12/2009 | Pasquinet et al. |
| 2010/0132848 | A1* | 6/2010 | Ikeda .................. C22C 38/02 148/507 |
| 2011/0266725 | A1 | 11/2011 | Mehrain et al. |
| 2012/0018060 | A1 | 1/2012 | Fushiwaki et al. |
| 2012/0090737 | A1 | 4/2012 | Fushiwaki et al. |
| 2013/0244056 | A1 | 9/2013 | Kawamura et al. |
| 2013/0292010 | A1 | 11/2013 | Kimura et al. |
| 2014/0083572 | A1 | 3/2014 | Schwartz |
| 2014/0120371 | A1 | 5/2014 | Mbacke et al. |
| 2014/0150930 | A1 | 6/2014 | Lee et al. |
| 2014/0205855 | A1 | 7/2014 | Kawata et al. |
| 2014/0209217 | A1 | 7/2014 | Nakagaito et al. |
| 2014/0212684 | A1 | 7/2014 | Kawata et al. |
| 2014/0212686 | A1 | 7/2014 | Imai et al. |
| 2014/0227556 | A1 | 8/2014 | Sato et al. |
| 2014/0234655 | A1 | 8/2014 | Takashima et al. |
| 2014/0234657 | A1 | 8/2014 | Azuma et al. |
| 2014/0234660 | A1 | 8/2014 | Kawata et al. |
| 2014/0255724 | A1 | 9/2014 | Yamanaka et al. |
| 2014/0342183 | A1 | 11/2014 | Wakabayashi et al. |
| 2015/0101712 | A1 | 4/2015 | Futamura et al. |
| 2015/0111064 | A1 | 4/2015 | Ikeda et al. |
| 2016/0177414 | A1 | 6/2016 | Takashima et al. |
| 2016/2237520 | | 8/2016 | Murata et al. |
| 2016/0304984 | A1 | 10/2016 | Genaud |
| 2016/0355903 | A1 | 12/2016 | Kwak et al. |
| 2016/0369369 | A1 | 12/2016 | Takashima et al. |
| 2017/0218472 | A1* | 8/2017 | Kawasaki ............ C21D 9/46 |

FOREIGN PATENT DOCUMENTS

| | | |
|---|---|---|
| JP | 2002129241 | 5/2002 |
| JP | 2012153957 | 8/2012 |

(56) References Cited

FOREIGN PATENT DOCUMENTS

| WO | 2014124749 A1 | 8/2014 |
| WO | 2016132680 A1 | 8/2016 |
| WO | 2016135794 A1 | 9/2016 |
| WO | 2016194272 A1 | 12/2016 |

OTHER PUBLICATIONS

Bhadhon et al., "Effect of Galvanizing Heat Treatment on the Microstructure and Mechanical Properties of a 6Mn-1.5 Si Third Generation Advanced High Strength Steel" Galvatech 2015 Proceedings, AIST, pp. 936-943.

Ding et al., "Effect of intercritical temperature on quenching and partitioning steels originated from martensitic pre-microstructure" J. Mater. Res., vol. 29, No. 21, 2014, pp. 2525-2533.

Sugimoto et al., "Effects of Second Phase Morphology on Retained Austenite Morphology and Tensile Properties in a TRIP-aided Dual-phase Steel Sheet" ISIJ Int'l., vol. 33, 1993, No. 7, pp. 775-782.

\* cited by examiner

HIGH STRENGTH STEEL PRODUCTS AND ANNEALING PROCESSES FOR MAKING THE SAME

CROSS-REFERENCE TO RELATED APPLICATIONS

This application claims priority to U.S. Provisional Application No. 62/334,189 filed May 10, 2016, and U.S. Provisional Application No. 62/396,602 filed Sep. 19, 2016, both of which are incorporated herein by reference.

FIELD OF THE INVENTION

The present invention relates to high strength steel products having favorable properties, and to annealing processes for making such products.

BACKGROUND INFORMATION

Over past several years, the worldwide steel industry has focused on development of a third generation of advanced high strength steel (AHSS) for the automotive market. These Generation 3 steels have a favorable balance of tensile strength and elongation, typically in a UTS xTE range of about 20,000 MPa-% or greater. However, the steel industry has had a difficult time commercializing Generation 3 AHSS as the majority of approaches require high alloy content, e.g., typically greater than 4 weight percent manganese, which results in difficulties when manufacturing such steels with conventional steel production equipment. Additionally, currently available AHSS has been difficult to weld by techniques such as spot welding, have been difficult to coat with zinc-based galvanic coatings, have been difficult to manufacture into the thin gauge sheet needed for wide scale application.

SUMMARY OF THE INVENTION

The present invention provides steel sheet products having controlled compositions that are subjected to two-step annealing processes to produce sheet products having desirable microstructures and favorable mechanical properties such as high strength and ultra-high formability. Steels processed in accordance with the present invention exhibit combined ultimate tensile strength and total elongation (UTS·TE) properties of greater than 25,000 MPa-% when tested using standard subsize ASTM or full size JIS tensile testing procedures. In addition, steels produced in accordance with the present invention exhibit favorable combinations of TE and hole expansion, i.e., both global formability and local formability are good. Steels with these properties fall into the category of Generation 3 advanced high strength steels, and are highly desired by various industries including automobile manufacturers.

An aspect of the present invention is to provide a high strength cold rolled steel sheet product comprising from 0.12 to 0.5 weight percent C, from 1 to 3 weight percent Mn, and from 0.8 to 3 weight percent of a combination of Si and Al, wherein the steel sheet product has been subjected to a two-step annealing process, comprises ferrite and substantially equiaxed retained austenite grains having an average aspect ratio of less than 3:1, and has a combination of ultimate tensile strength and total elongation UTS·TE of greater than 25,000 MPa %.

Another aspect of the present invention is to provide a method of producing a high strength cold rolled steel sheet product comprising from 0.12 to 0.5 weight percent C, from 1 to 3 weight percent manganese, and from 0.8 to 3 weight percent of a combination of Si and Al. The method comprises subjecting the steel sheet product to a first step annealing process to achieve a predominantly martensitic microstructure, and subjecting the steel sheet product to a second step process comprising soaking the sheet product in an intercritical regime at a temperature of from 720 to 850° C., followed by holding the sheet product at a temperature of from 370 to 430° C.

These and other aspects of the present invention will be more apparent from the following description.

DETAILED DESCRIPTION

Figure 1:
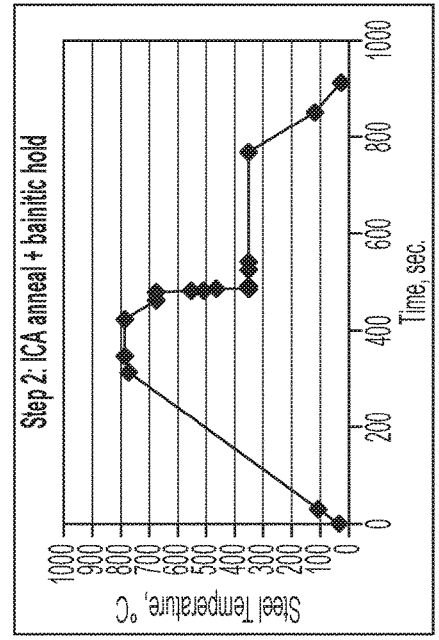
FIG. 1 includes plots of temperature versus time illustrating a two-step annealing process in accordance with an embodiment of the present invention.

The high strength steel sheet products of the present invention have controlled compositions that, in combination with controlled annealing processes, produce desirable microstructures and favorable mechanical properties including high strengths and ultra-high formabilities. In certain embodiments, the steel composition may include carbon, manganese and silicon, along with any other suitable alloying additions known to those skilled in the art. Examples of steel compositions including ranges of C, Mn, Si, Al, Ti, and Nb are listed in Table 1 below.

TABLE 1

| | Steel Compositions (wt. %) | | | | | | |
|---|---|---|---|---|---|---|---|
| Example | C | Mn | Si | Al | Si + AL | Ti | Nb |
| A | 0.12-0.5 | 1-3 | 0-2 | 0-2 | 0.8-3 | 0-0.05 | 0-0.05 |
| B | 0.15-0.4 | 1.3-2.5 | 0.2-1.8 | 0-1.5 | 0.9-2.5 | 0-0.03 | 0-0.03 |
| C | 0.17-0.35 | 1.5-2.3 | 0.4-1.5 | 0-1 | 1-2 | 0-0.02 | 0-0.02 |

In addition to the amounts of C, Mn, Si, Al, Ti and Nb listed in Table 1, the steel compositions may include minor or impurity amounts of other elements, such as 0.015 max S, 0.03 max P, 0.2 max Cu, 0.02 max Ni, 0.2 max Cr, 0.2 max Mo, 0.1 max Sn, 0.015 max N, 0.1 max V, and 0.004 max B. As used herein the term "substantially free", when referring to the composition of the steel sheet product, means that a particular element or material is not purposefully added to the composition, and is only present as an impurity or in trace amounts.

In the steel sheet products of the present invention, C provides increased strength and promotes the formation of retained austenite. Mn provides hardening and acts as a solid solution strengthener. Si inhibits iron carbide precipitation during heat treatment, and increases austenite retention. Al inhibits iron carbide precipitation during heat treatment, and increases austenite retention. Ti and Nb may act as a strength-enhancing grain refiners.

In certain embodiments, Al may be present in an amount of at least 0.1 weight percent or at least 0.2 weight percent. For example, Al may be present in an amount of from 0.5 to 1.2 weight percent, or from 0.7 to 1.1 weight percent, in certain embodiments. Alternatively the steel sheet product may be substantially free of Al.

Steel sheet products having compositions as described above are subjected to a two-stage annealing process, as more fully described below. The resultant sheet products have been found to possess favorable mechanical properties including desirable ultimate tensile strengths, high elongations, high lambda values, high bendability and high yield ratios (YS/UTS).

In certain embodiments, the ultimate tensile strength (UTS) of the steel sheet products range from 700 to 1,100 MPa or more. In certain embodiments, the steel sheet product has an ultimate tensile strength of greater than 700 MPa, for example, from 720 to 1,100 MPa, or from 750 to 1,050 MPa.

In certain embodiments, the steel sheet products have a total elongation (TE) typically greater than 22 percent, for example, greater than 27 percent, or greater than 33 percent. For example, the steel sheet product may have a total elongation of at least 200%, e.g., from 22 to 45%, or from 25 to 40%.

The steel sheet products may possess lambda ($\lambda$) values as measured by a standard hole expansion test typically greater than 20 percent, for example, greater than 25 percent, or greater than 30 percent, or greater than 35 percent. The whole expansion ratio or lambda may be greater than 20%, for example, from 22 to 80%, or from 25 to 60%.

In certain embodiments, increased values of both total elongation (TE) and hole expansion ($\lambda$) result in steel sheet products exhibiting good global formability and local formability.

Strength elongation balances (UTS·TE) of greater than 25,000 are observed for the present steel sheet products, making them fall into the category of Generation 3 steels highly desired by industries such as the auto industry. In certain embodiments UTS·TE values may be greater than 30,000, or greater than 35,000.

In accordance with certain embodiments of the invention, the final microstructure of the steel sheet products may primarily comprise ferrite, e.g., at least 50% up to 80% or higher, with lesser amounts of retained austenite, e.g., from 5 to 25%, and minor amounts of fresh martensite, e.g., from 0 to 10% or 15%. The amounts of ferrite, austenite and martensite may be determined by standard EBSD techniques. Alternatively, retained austenite content may be determined by magnetic saturation methods. Unless otherwise specified herein, the volume percent of retained austenite is determined by the EBSD technique.

In certain embodiments, the retained austenite comprises from 1 to 25 volume percent, for example, from 5 to 20 volume percent. The amount of fresh martensite may comprise less than 15 volume percent, or less than 10 volume percent, or less than 5 volume percent. In certain embodiments, the steel sheet product is substantially free of fresh martensite. It has been found that when fresh martensite amounts are greater than 15%, hole expansion values decrease significantly, e.g., local formability is significantly decreased.

At least a portion of the ferrite may be formed during the heating section, as described below, by recrystallization and/or tempering of martensite, or during the cooling and holding section of the second annealing process by austenite decomposition. Some of the ferrite may be considered bainitic ferrite. The ferrite, austenite and martensite phases are fine grained, e.g., having average grain sizes of less than 10 microns, for example, less than 5 microns, or less than 3 microns. For example, ferrite grain size may range from less than 10 microns, for example, less than 8 microns, or less than 6 microns. Average austenite grain size may range from less than 2 microns, for example, less than 1 micron, or less than 0.5 micron. Martensite grain size, when present, may range from less than 10 microns, for example, less than 8 microns, or less than 6 microns.

The austenite grains may be substantially equiaxed, e.g., having average aspect ratios less than 3:1 or less than 2:1, for example, about 1:1. It has been found that amounts of retained austenite below about 5% results in significantly decreased total elongations (TE). It has further been found that amounts of retained austenite above 25% can only be obtained at very high carbon levels, which results in poor weldability.

Figure 2:
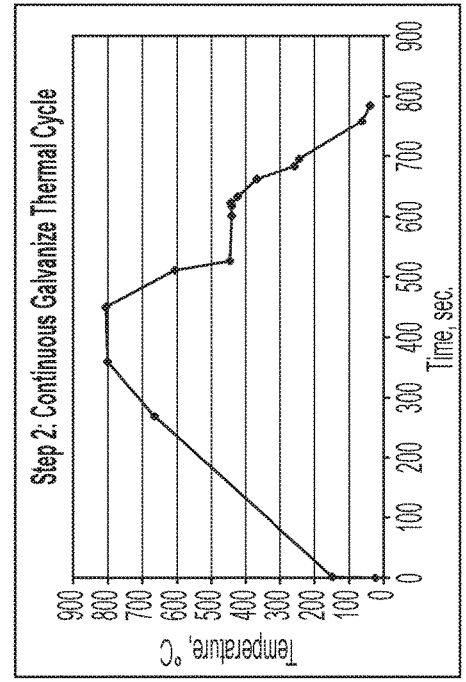
FIG. 2 includes plots of temperature versus time illustrating a two-step annealing process in accordance with another embodiment of the present invention.
Figure 3:
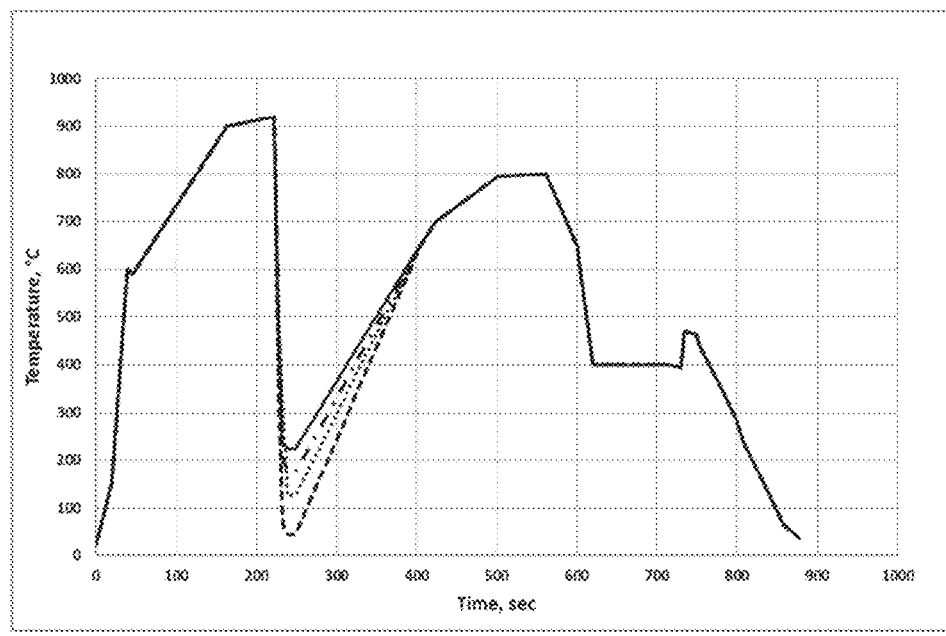
FIG. 3 is a plot of temperature versus time illustrating a two-step annealing process that combines the two step thermal process with an optional zinc-based hot-dipped coating operation in a single production facility.

In certain embodiments of the invention, a two-step annealing process is used to produce advanced high strength steel products with favorable mechanical properties, such as those described above. Within each of the first and second annealing steps, multiple methodologies for undertaking the heat treatment may be used. Examples of two-step annealing processes are shown in FIGS. 1-3 and described below. FIG. 1 represents a continuous annealing line (CAL) followed by a continuous annealing line (CAL) production route. FIG. 2 represents a CAL plus continuous galvanizing line (CGL) production route. FIG. 3 represents a specially designed line allowing for both CAL+CAL or CAL+CGL steps to take place in a single facility. While a direct-fired furnace (DFF) followed by a radiant tube (RT) furnace embodiment is shown in FIG. 3, other embodiments such as all radiant tube, electric radiant heating, and the like may be used to achieve the desired thermal cycles.

Step 1

The goal of the first step of the annealing process is to achieve a martensitic microstructure. In the first annealing stage of the first step, an annealing temperature above the $A_3$ temperature may typically be used, for example, an annealing temperature of at least 820° C. may be used. In certain embodiments, the first stage annealing temperature may typically range from 830 to 980° C., for example, from 830 to 940° C., or from 840 to 930° C., or from 860 to 925° C. In certain embodiments, the peak annealing temperature may be typically held for at least 20 seconds, for example, from 20 to 500 seconds, or from 30 to 200 seconds. Heating may be accomplished by conventional techniques such as a non-oxidizing or oxidizing direct-fired furnace (DFF), oxygen-enriched DFI, induction, gas radiant tube heating, electric radiant heating, and the like. Examples of heating systems that may be adapted for use in the processes of the present invention are disclosed in U.S. Pat. Nos. 5,798,007; 7,368,689; 8,425,225; and 8,845,324, U.S. Patent Application No. 2009/0158975, and Published PCT Application No. WO/2015083047, assigned to Fives Stein. Additional examples of heating systems that may be adapted for use in the processes of the present invention include U.S. Pat. No. 7,384,489 assigned to Drever International, and U.S. Pat. No. 9,096,918 assigned to Nippon Steel and Sumitomo Metal Corporation. Any other suitable known types of heating systems and processes may be adapted for use in Step 1 and Step 2.

In the first stage, after the peak annealing temperature is reached and held for the desired period of time, the steel is quenched to room temperature, or to a controlled temperature above room temperature, as more fully described below. The quench temperature may not necessarily be room temperature but should be below the martensite start temperature ($M_s$), and preferably below the martensite finish temperature ($M_F$), to form a microstructure of predominantly martensite. In certain embodiments, between the first step process and the second step process, the steel sheet product may be cooled to a temperature below 300° C., for example, below 200° C.

Quenching may be accomplished by conventional techniques such as water quenching, submerged knife/nozzle water quenching, gas cooling, rapid cooling using a combination of cold, warm or hot water and gas, water solution cooling, other liquid or gas fluid cooling, chilled roll quench, water mist spray, wet flash cooling, non-oxidizing wet flash cooling, and the like. A quench rate of from 30 to 2,000° C./sec may typically be used.

Various types of cooling and quenching systems and processes known to those skilled in the art may be adapted for use in the processes of the present invention. Suitable cooling/quenching systems and processes conventionally used on a commercial basis may include water quench, water mist cooling, dry flash and wet flash, oxidizing and non-oxidizing cooling, alkane fluid to gas phase change cooling, hot water quenching, including two-step water quenching, roll quenching, high percentage hydrogen or helium gas jet cooling, and the like. For example, dry flash and/or wet flash oxidizing and non-oxidizing cooling/ quenching such as disclosed in published PCT Application No. WO2015/083047 to Fives Stein may be used. Other Fives Stein patent documents describing cooling/quenching systems and processes that may be adapted for use in the processes of the present invention include U.S. Pat. Nos. 6,464,808B2; 6,547,898B2; and 8,918,199B2, and U.S. Patent Application Publication Nos. US2009/0158975A1; US2009/0315228A1; and US2011/0266725A1. Other examples of cooling/quenching systems and processes that may be adapted for use in the processes of the present invention include those disclosed in U.S. Pat. Nos. 8,359, 894B2; 8,844,462B2; and 7,384,489B2, and U.S. Patent Application Publication Nos. 2002/0017747A1 and 2014/ 0083572A1.

In certain embodiments, after the first-stage peak annealing temperature is reached and the steel is quenched to form martensite, the martensite can be optionally tempered to soften the steel somewhat to make further processing more feasible. Tempering takes place by raising the temperature of the steel in the range of room temperature to about 500° C. and holding for up to 600 seconds. If tempering is utilized, the tempering temperature may be held constant, or may be varied within this preferred range.

After tempering, the temperature is ramped down to room temperature. The rate of such ramp-down may typically range from 1 to 40° C./sec, for example, from 2 to 20° C./sec. In the case of a single pass facility furnace, as in FIG. 3, tempering may not be necessary.

Step 2

Figure 4:
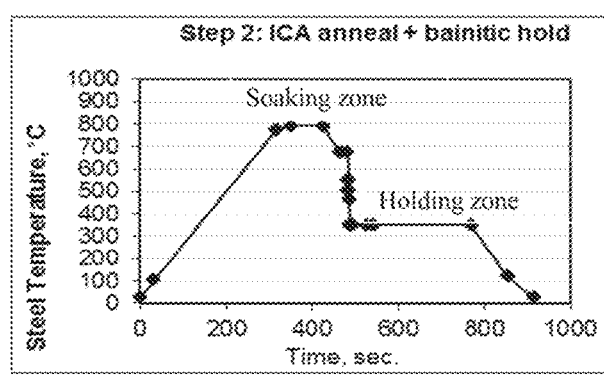
FIG. 4 is a plot of temperature versus time for a second step of an annealing process defining soaking and holding zones in the thermal cycle in accordance with an embodiment of the invention.

The second step of the annealing process may include a first stage that is conducted at relatively high annealing temperature, and a second stage that is conducted at relatively low temperature. These stages are defined as the "soaking" and "holding" zones of the second anneal, as described in FIG. 4. The temperatures are controlled in order to promote the formation of the desired microstructure in the final product.

In the first annealing stage of the second step, a soaking zone temperature between $A_1$ and $A_3$ may be used, for example, an annealing temperature of at least 720° C. may be used. In certain embodiments, the soaking zone temperature may typically range from 720 to 850° C., for example, from 760 to 825° C. In certain embodiments, the peak annealing temperature may be typically held for at least 15 seconds, for example, from 20 to 300 seconds, or from 30 to 150 seconds.

During the first stage of the second step, the soaking zone temperature may be achieved by heating the steel from a relatively low temperature below $M_s$, e.g., room temperature, at an average rate of from 0.5 to 50° C./sec, for example, from about 2 to 20° C./sec. In certain embodiments, the ramp-up may take from 25 to 800 seconds, for example, from 100 to 500 seconds. The first stage heating of the second step may be accomplished by any suitable heating system or process, such as using radiant heating, induction heating, direct fired furnace heating and the like.

After the soaking zone temperature is reached and held for the desired period of time, the steel may be cooled to a controlled temperature above room temperature to the holding zone. In certain embodiments, the steel sheet product is maintained at a temperature above 300° C. between the second step soaking process and the second step holding process. Cooling from the soaking to holding zone may be accomplished by conventional techniques such as water cooling, gas cooling and the like. An average cooling rate of from 5 to 400° C./sec may typically be used. Any suitable types of cooling and quenching systems may be adapted for use in cooling from the soaking temperature to the holding temperature, including those described above.

In accordance with embodiments of the invention, the holding zone step is carried out at a typical temperature of from 360 to 440° C., for example, from 370 to 430° C. The holding zone may be held for up to 800 seconds, for example, from 30 to 600 seconds.

The holding zone temperature may be held constant, or may be varied somewhat within the preferred temperature range. After holding, the steel may be reheated, such as by induction or other heating method, to enter a hot-dip coating pot at the proper temperature for good coating results, if the steel is to be hot-dip coated.

In certain embodiments, after the holding zone temperature has been maintained for a desired period of time, the temperature may be ramped down to room temperature. Such a ramp-down may typically take from 10 to 1,000 seconds, for example, from about 20 to 500 seconds. The rate of such ramp-down may typically range from 1 to 1,000° C./sec, for example, from 2 to 20° C./sec.

In accordance with certain embodiments, one or both of the first-step and second-step annealing processes may be performed on a continuous annealing line (CAL). After going through a CAL+CAL process, the steel may be electrogalvanized to produce a zinc based coated product.

In certain embodiments, the annealed steel sheet is hot-dip galvanized at the end of the holding zone. Galvanizing temperatures may typically range from 440 to 480° C., for example, from 450 to 470° C. In certain embodiments, the galvanizing step may be performed as part of the second-step annealing process on a continuous galvanizing line (CGL), e.g., as shown in FIG. 2. This CAL+CGL process can be used to produce both a zinc-based or zinc alloy-based hot-dip galvanized product or reheated after coating to produce an iron-zinc galvanneal type coated product. An optional nickel-based coating step can take place between the CAL and CGL steps in the process to improve zinc coating properties. The use of a continuous galvanizing line in the second step increases the production efficiency of producing a coated GEN3 product versus using a CAL+CAL+EG route.

A galvanized product or zinc-based alloy hot-dip coated product can also be made on a specially designed CGL in which the two-step annealing can take place in a single line, as shown in FIG. 3. Galvannealing can also be an option in this case. Furthermore, a single production facility can also be specially designed and built to combine the two step thermal process to produce uncoated Generation 3 steels as defined in the invention.

The following examples are intended to illustrate various aspects of the present invention, and are not intended to limit the scope of the invention.

Example 1

Figure 5:
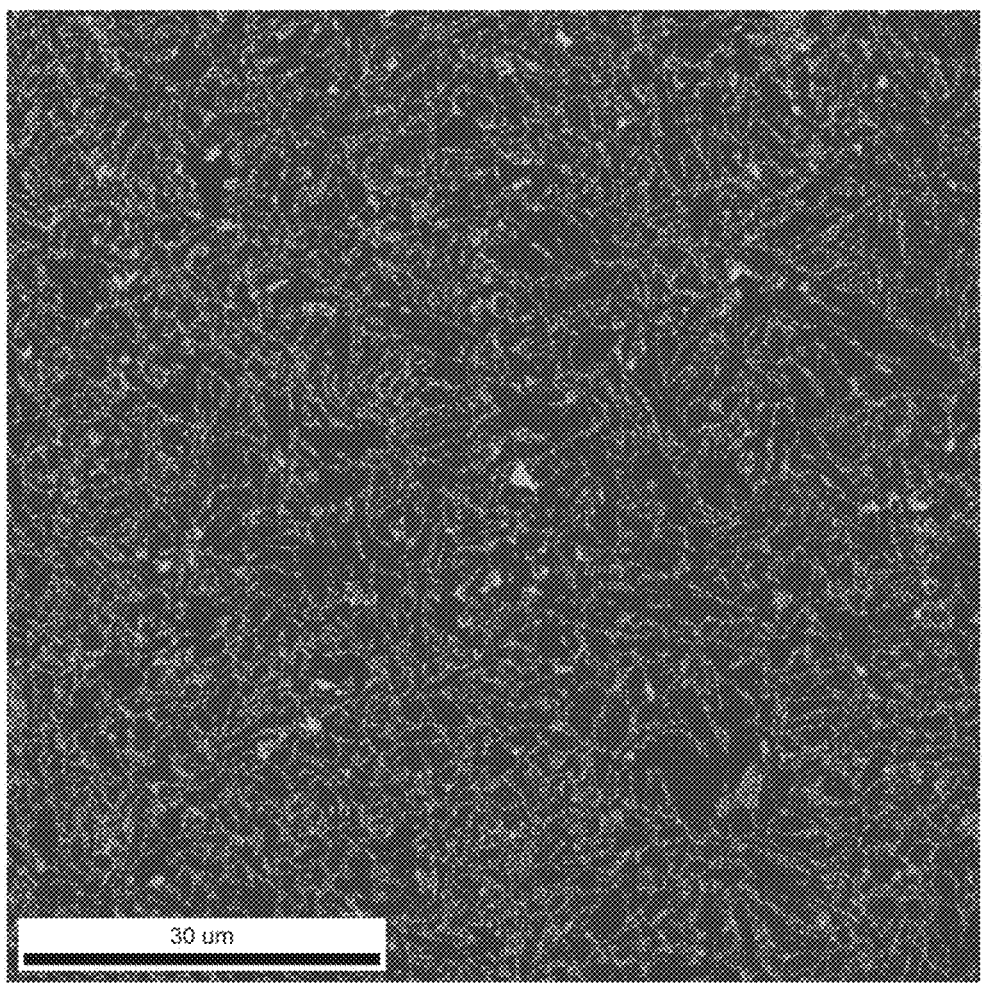
FIGS. 5 and 6 are electron backscatter diffraction (EBSD) photomicrographs illustrating the microstructure of a high strength steel sheet product in accordance with an embodiment of the invention.
Figure 6:
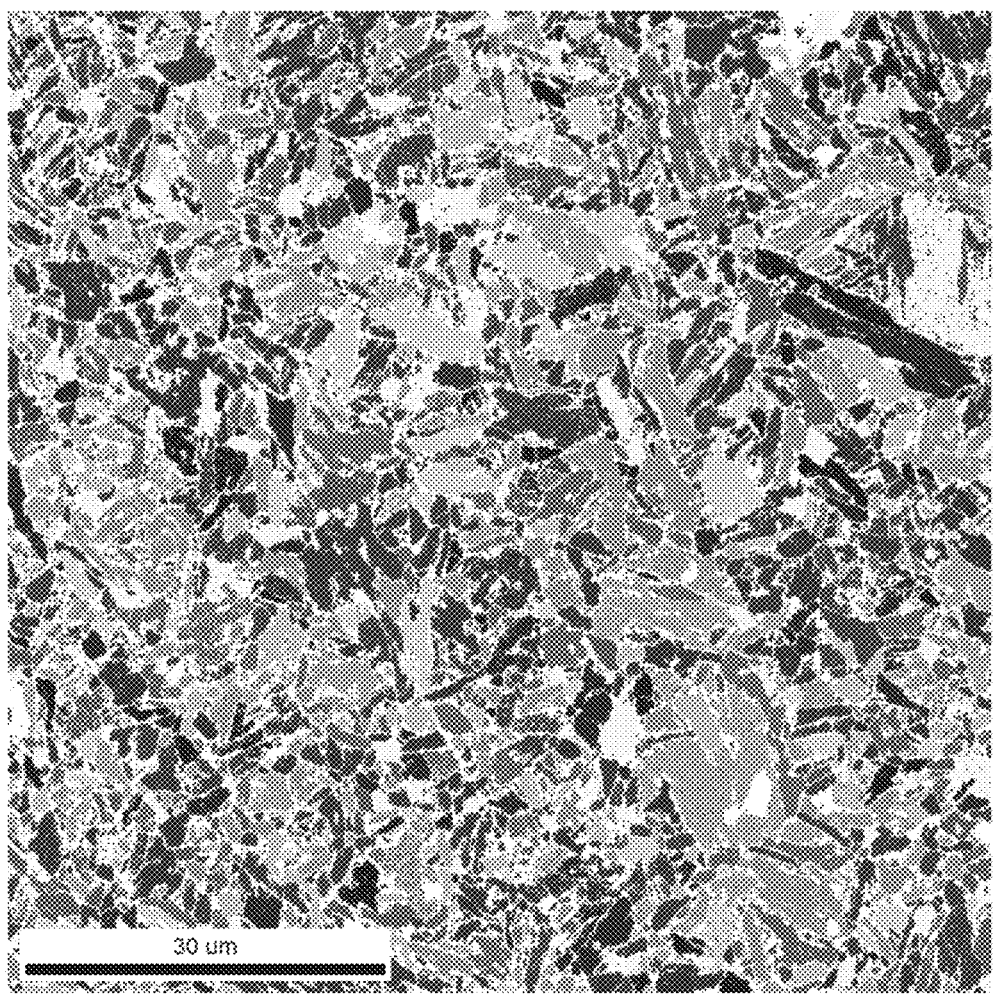

A cold rolled steel sheet having a composition as listed in Table 2, Sample No. 1, was subjected to a two-step annealing process as illustrated in FIG. 1. The microstructure of the resultant product is shown in FIGS. 5 and 6. EBSD techniques using commercial EDAX orientation imaging microscopy software show the dark ferrite grains and light austenite grains in FIG. 5.

Example 2

Figure 9:
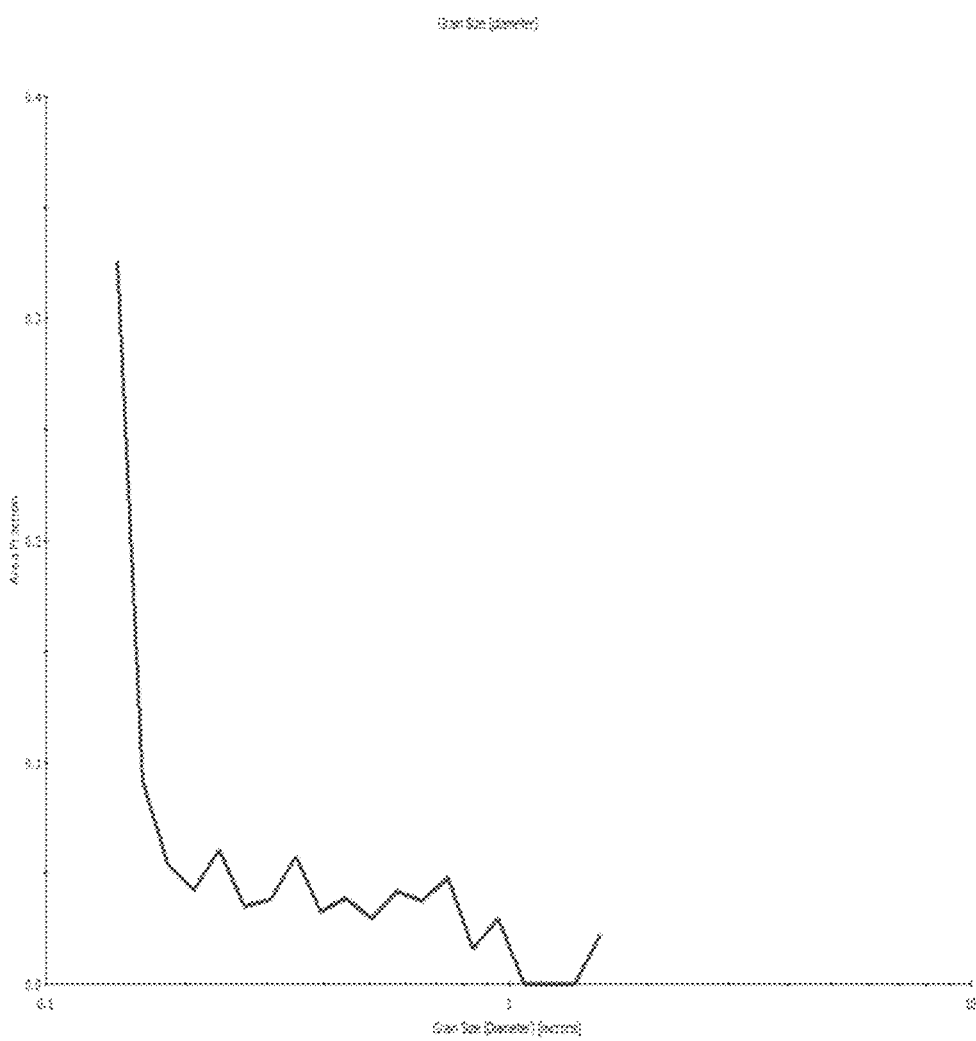
FIGS. 9 and 10 are graphs for a high strength steel sheet product showing austenite and ferrite grain size distributions in accordance with an embodiment of the invention.
Figure 10:
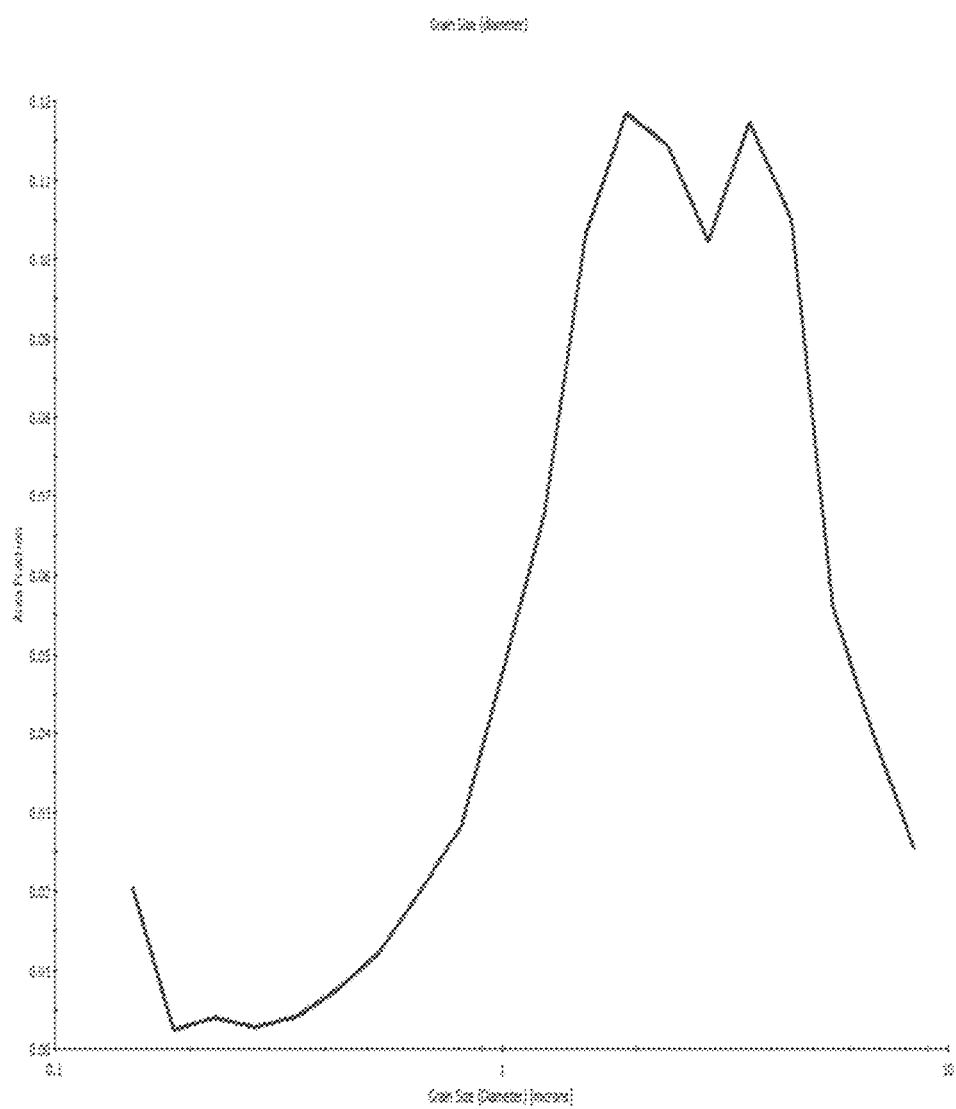
Figure 11:
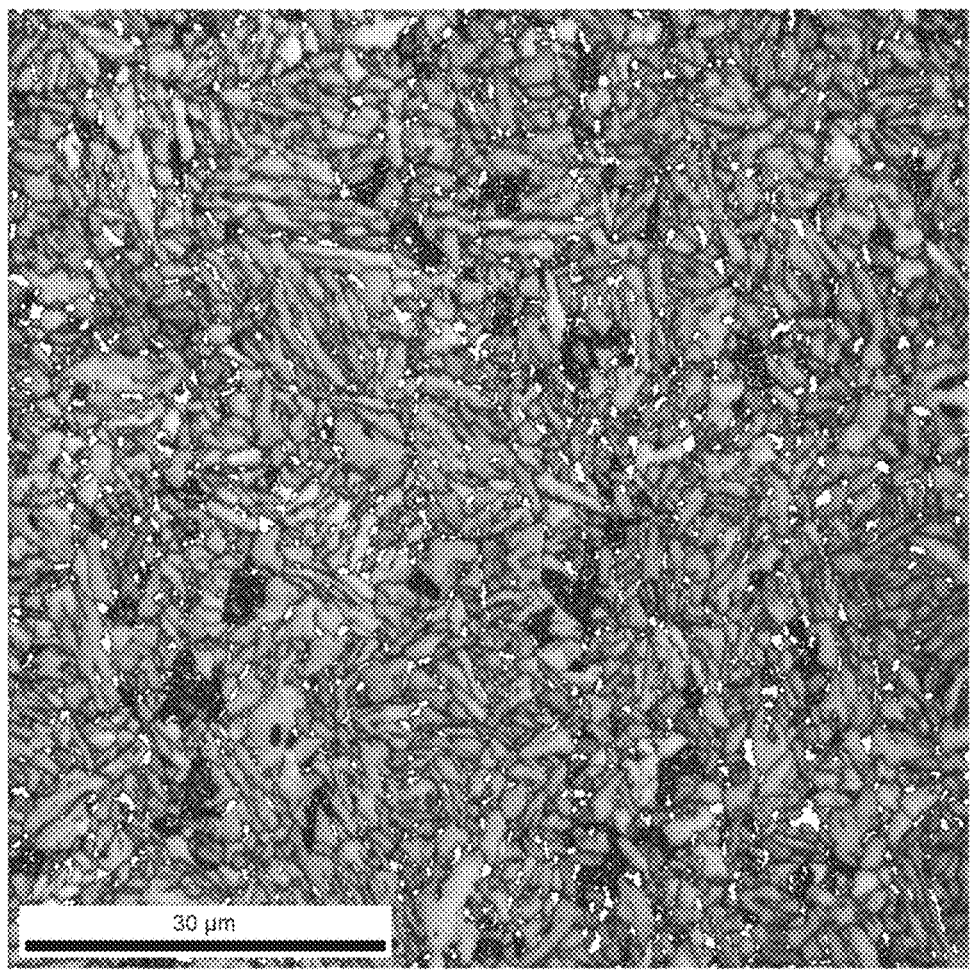
FIG. 11 is EBSD photomicrograph illustrating the microstructure of a high strength steel sheet product processed as shown in FIG. 1.

A cold rolled steel sheet having a composition as listed in Table 2, Sample No. 2, was subjected to a two-step annealing process as illustrated in FIG. 1. The microstructure of the resultant product is shown in FIG. 11. Mechanical properties of Sample No. 2 are listed in Table 2. Grain size distributions of austenite and ferrite are shown in FIGS. 9 and 10, respectively. The average austenite grain size is less than 1 micron and the average ferrite grain size is less than 10 microns.

The microstructure includes about 80 volume percent ferrite with an average grain size of about 5 microns, about 10 volume percent retained austenite having substantially equiaxed grains and an average grain size of about 0.5 micron, and about 10 volume percent fresh martensite with an average grain size of about 5 microns. Mechanical properties of Sample No. 1 are listed in Table 2 below.

Example 3

Figure 12:
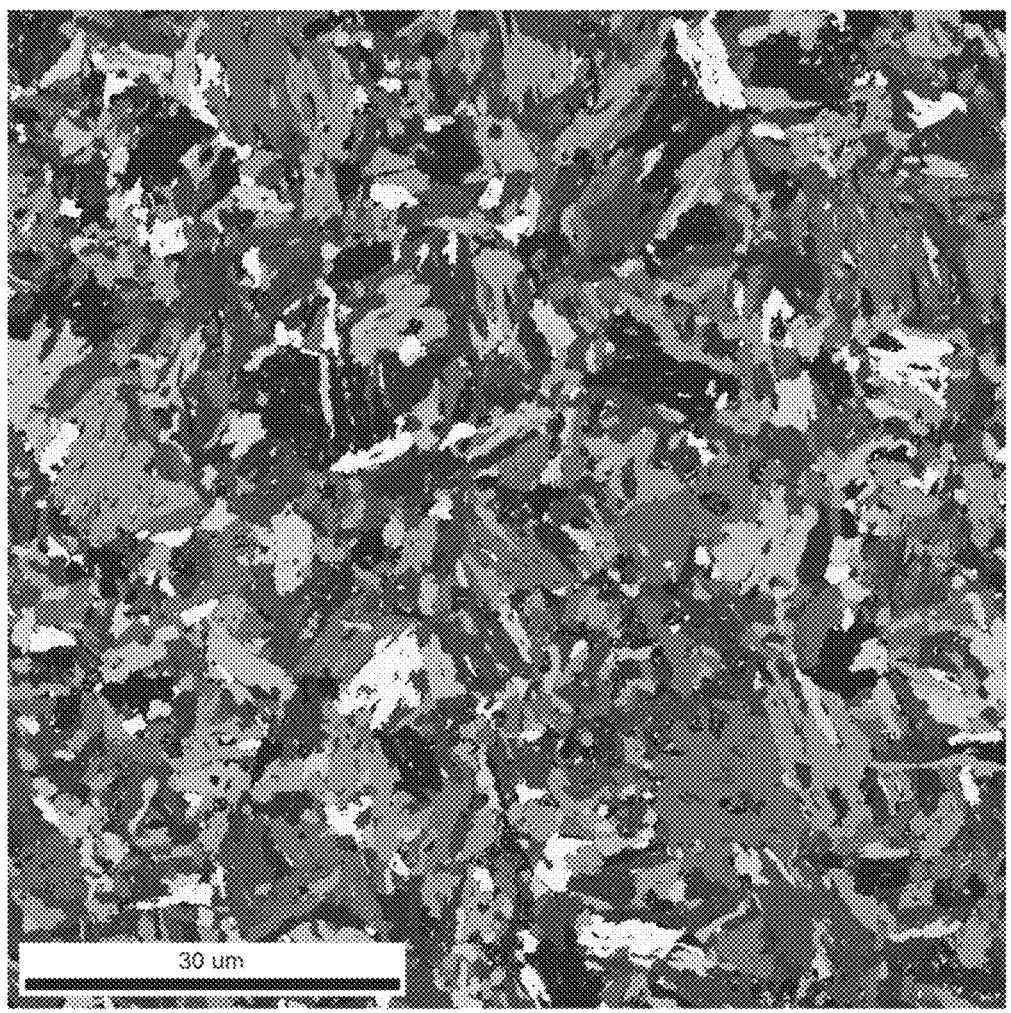
FIGS. 12 and 13 are EBSD photomicrographs showing steel sheet products processed as shown in FIG. 2.
Figure 13:
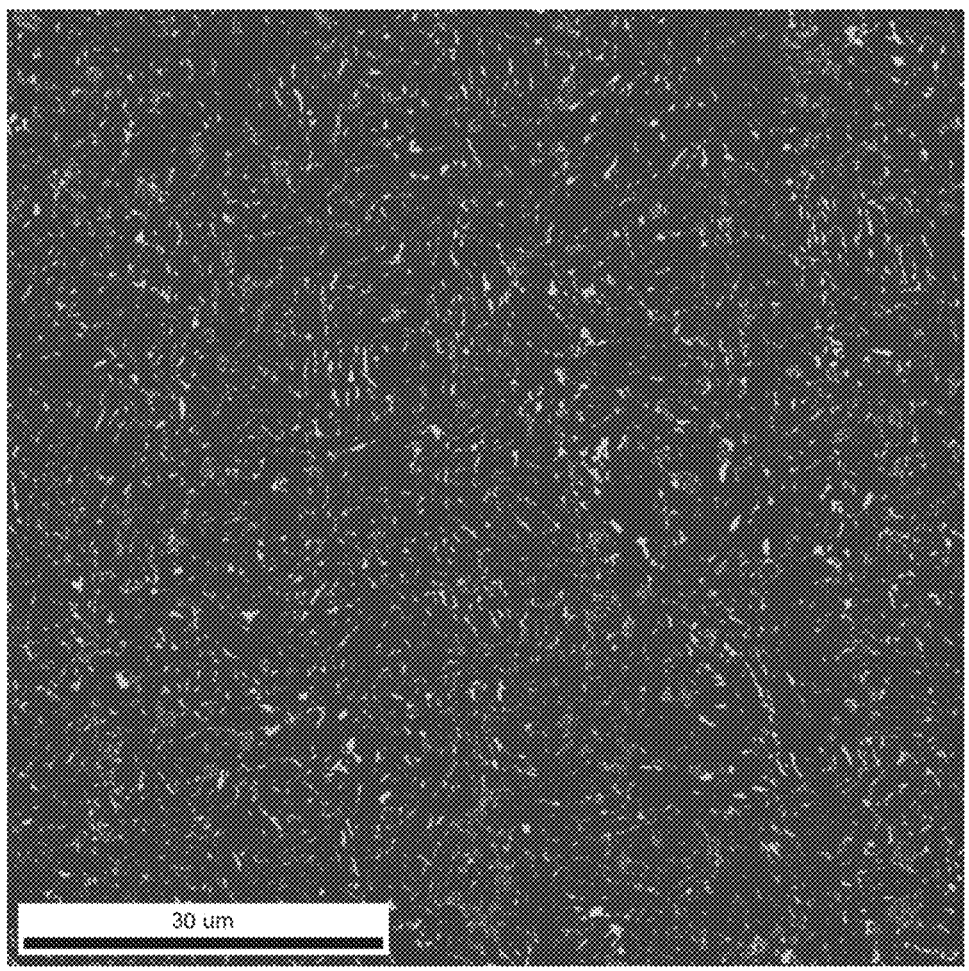

A cold rolled steel sheet having a composition as listed in Table 2, Sample No. 3, was subjected to a two-step annealing process as illustrated in FIG. 2. The microstructure of the resultant product is shown in FIGS. 12 and 13. In FIG. 13, austenite is light in color and ferrite is dark in color. Mechanical properties of Sample No. 3 are listed in Table 2.

Example 4

Figure 14:
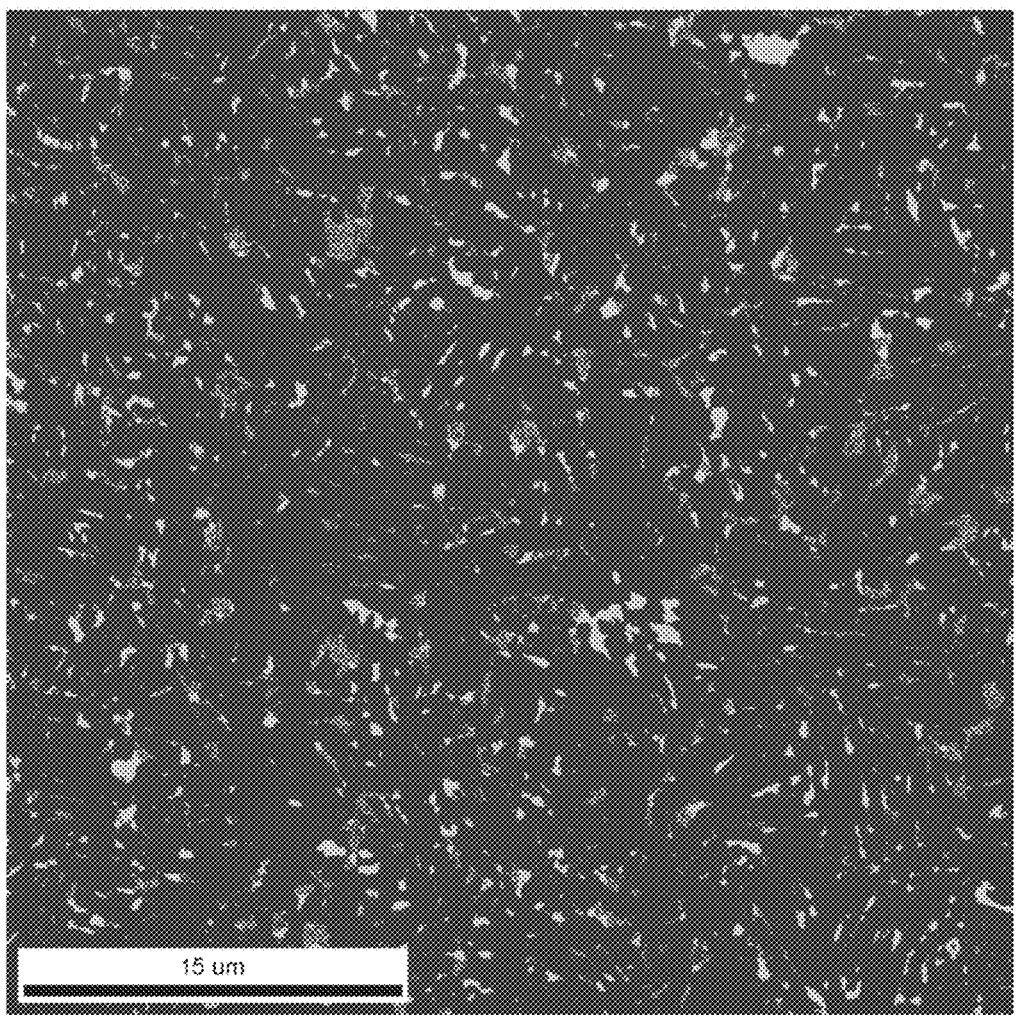
FIG. 14 is an EBSD photomicrograph of a steel sheet product processed as shown in FIG. 3.

A cold rolled steel sheet having a composition as listed in Table 2, Sample No. 4, was subjected to a two-step annealing process as illustrated in FIG. 3. The microstructure of the resultant product is shown in FIG. 14. In FIG. 14, austenite is light in color and ferrite is dark in color. Mechanical properties of Sample No. 4 are listed in Table 2.

Example 5

A cold rolled steel sheet having a composition as listed in Table 2, Sample No. 5, was subjected to a two-step annealing process as illustrated in FIG. 1. Mechanical properties of Sample No. 5 are listed in Table 2.

Example 6

Figure 7:
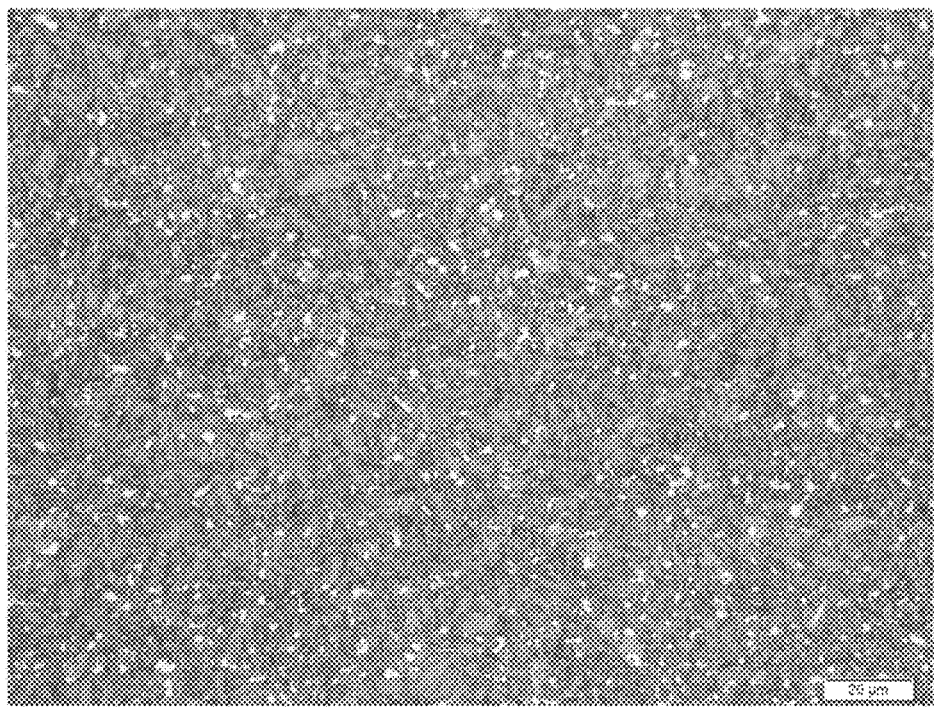
FIG. 7 is an optical photomicrograph of a steel sheet product subjected to the thermal process shown in FIG. 1, showing darker ferrite grains and lighter austenite grains.
Figure 8:
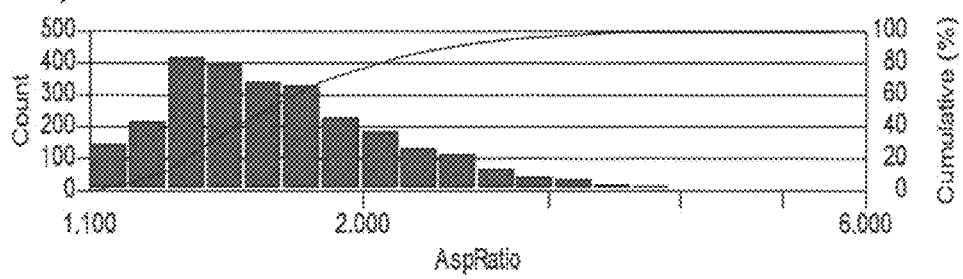
FIG. 8 is a bar graph illustrating aspect ratios of the austenite grains shown in FIG. 7.

A cold rolled steel sheet having a composition as listed in Table 2, Sample No. 6, was subjected to a two-step annealing process as illustrated in FIG. 1. Mechanical properties of Sample No. 6 are listed in Table 2. FIG. 7 is an optical image showing the microstructure of the steel shown in FIG. 2, Sample No. 6, which was subjected to the two-step annealing process shown in FIG. 1. In FIG. 7, the dark regions of the photomicrograph are ferrite grains, while the light regions are austenite grains. FIG. 8 is a graph illustrating the aspect ratios of the austenite grains shown in FIG. 7. The optical image of FIG. 7 was used to determine the aspect ratios of the austenite grains using image analysis with commercially available software. FIG. 7 shows that the average aspect ratio is less than 3:1 for the austenite grains.

Example 7

A cold rolled steel sheet having a composition as listed in Table 2, Sample No. 7, was subjected to a two-step annealing process as illustrated in FIG. 2. Mechanical properties of Sample No. 7 are listed in Table 2.

A cold rolled steel sheet having a composition as listed in Table 2, Sample No. 8, was subjected to a two-step annealing process as illustrated in FIG. 3. Mechanical properties of Sample No. 8 are listed in Table 2.

The steels in Examples 1-8 exhibited UTS levels in the range of 700 to 1,100 MPa.

Comparative Examples 1-4

Cold rolled steel sheets having compositions as listed in Table 2, Sample Nos. C1-C4, were subjected to a two-step annealing process as illustrated in FIG. 1. Mechanical properties of Sample Nos. C1-C4 are listed in Table 2. The steels in Comparative Examples 1-4 exhibited UTS levels less than 700 MPa.

Comparative Examples 5-8

Cold rolled steel sheets having compositions as listed in Table 2, Sample Nos. C5-C8, were subjected to a two-step annealing process as illustrated in FIG. 1. Mechanical properties of Sample Nos. C5-C8 are listed in Table 2. The steels in Comparative Examples 5-8 exhibited UTS levels greater than 1,100 MPa.

Comparative Examples 9-11

Cold rolled steel sheets having compositions as listed in Table 2, Sample Nos. C9-C11, were subjected to a two-step annealing process similar to that illustrated in FIG. 1, except the soaking or holding temperature in the second anneal were outside the preferred ranges of the invention. Mechanical properties of Sample Nos. C9-C11 are listed in Table 2.

Comparative Example 12

A cold rolled sheet having a composition listed in Table 2, Sample No. C12, was subjected to a two-step annealing process similar to that illustrated in FIG. 2, except the holding zone temperature in the second anneal was outside the preferred range of the invention. Mechanical properties of Sample No. C12 are listed in Table 2.

TABLE 2

| Sample No. | Product Type | Process | C | Mn | Si | Other | YS (MPa) | UTS (MPa) | TE (%) | UTS * TE | Lambda |
|---|---|---|---|---|---|---|---|---|---|---|---|
| 1 | CR 780 GEN3 super elongation | CAL + CAL | 0.22 | 1.5 | 1.5 | | 657 | 831 | 39.2 | 32575 | 44 |
| 2 | CR 980 GEN3 | CAL + CAL | 0.185 | 2.2 | 1.4 | | 630 | 1030 | 25 | 25750 | 30 |
| 3 | Hot-dipped 980 GEN3 | CAL + CGL | 0.22 | 2.25 | 0.45 | 0.8Al, 0.02Ti, 0.02Nb | 576 | 988 | 30.2 | 29838 | 20 |
| 4 | Hot-dipped 980 | Single process in newly designed CGL | 0.185 | 2.2 | 1.4 | | 580 | 998 | 29.1 | 29042 | |
| 5 | CR 980 GEN3 Super elongation | CAL + CAL | 0.35 | 1.5 | 1.5 | | 685 | 999 | 38.2 | 38161 | 25 |
| 6 | CR 780 GEN3 | CAL + CAL | 0.175 | 1.8 | 1.5 | | 630 | 840 | 33 | 27720 | 45 |
| 7 | Hot-dipped 780 GEN3 | CAL + CGL | 0.2 | 2.3 | 0.4 | 1.0Al | 533 | 915 | 32.8 | 30012 | 30 |
| 8 | Hot-dipped 780 GEN3 | Single process in newly designed CGL | 0.2 | 2.3 | 0.4 | 1.0Al | 589 | 865 | 34.4 | 29756 | |
| C1 | Alloy 1 | CAL + CAL | 0.105 | 1.55 | 1.2 | | 512 | 666 | 32.6 | 21712 | 67 |
| C2 | Alloy 2 | CAL + CAL | 0.14 | 1.5 | 1.3 | | 556 | 690 | 30.2 | 20838 | 59 |
| C3 | Alloy 3 | CAL + CAL | 0.17 | 1.1 | 1.1 | | 560 | 686 | 26.9 | 18453 | 53 |
| C4 | Alloy 4 | CAL + CAL | 0.13 | 0.9 | 0.9 | | 533 | 618 | 26.0 | 16068 | 81 |
| C5 | Alloy 1 | CAL + CAL | 0.21 | 2.15 | 1.5 | 0.003B | 597 | 1125 | 17.2 | 19350 | 25 |
| C6 | Alloy 2 | CAL + CAL | 0.2 | 2.2 | 1.5 | 0.2Mo | 585 | 1148 | 16.3 | 18712 | 13 |
| C7 | Alloy 3 | CAL + CAL | 0.23 | 2.4 | 1.5 | 0.003B | 683 | 1231 | 16.2 | 19942 | 6.7 |
| C8 | Alloy 4 | CAL + CAL | 0.19 | 2.64 | 2.0 | | 635 | 1359 | 14.8 | 20113 | 3.4 |
| C9 | Alloy 1 - High Soak (849 C) | CAL + CAL | 0.18 | 2.2 | 1.34 | | 693 | 1058 | 18.2 | 19256 | 25 |
| C10 | Alloy 2 - Low Hold (350 C) | CAL + CAL | 0.18 | 2.2 | 1.34 | | 602 | 1035 | 21.2 | 21942 | 30 |
| C11 | Alloy 3 - High Hold (450 C) | CAL + CAL | 0.18 | 2.2 | 1.34 | | 477 | 1059 | 19.7 | 20862 | 19 |

TABLE 2-continued

| Sample No. | Product Type | Process | C | Mn | Si | Other | YS (MPa) | UTS (MPa) | TE (%) | UTS * TE | Lambda |
|---|---|---|---|---|---|---|---|---|---|---|---|
| C12 | Alloy 4 - High Hold (471 C) | CAL + CGL | 0.22 | 2.4 | 0.4 | 0.8 Al | 465 | 1012 | 23.0 | 23276 | 16.5 |

Figure 15:
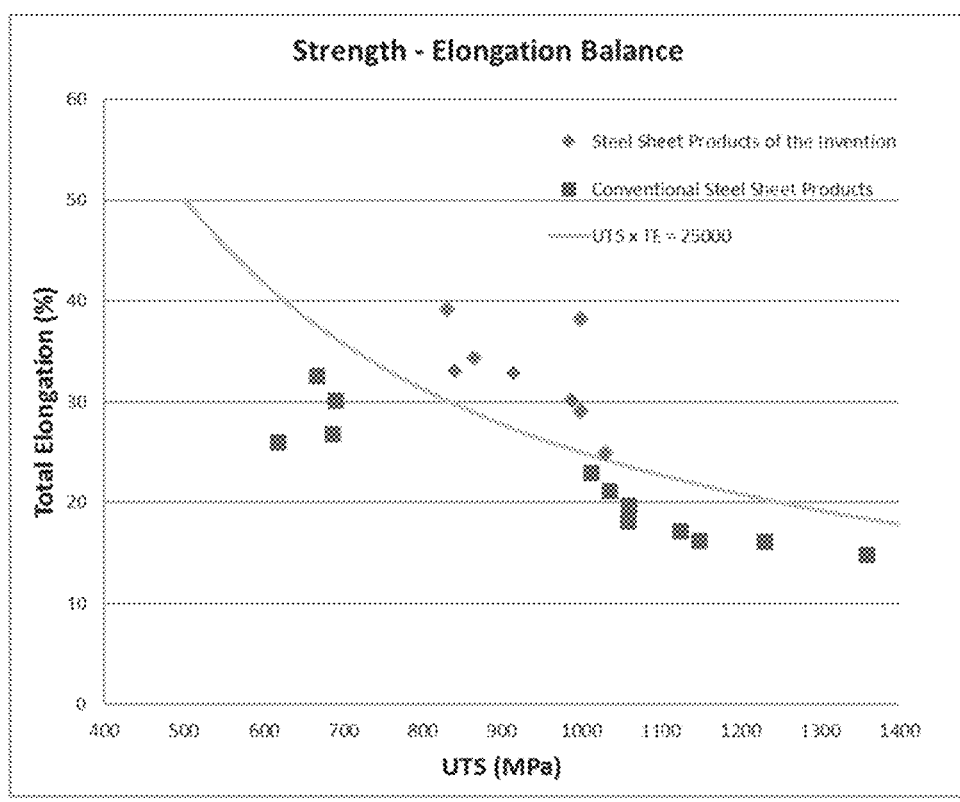
FIG. 15 is a graph of total elongation vs. ultimate tensile strength for high strength steel sheet products of the present invention in comparison with other steel sheet products processed outside the scope of the present invention.

FIG. 15 plots the total elongation (TE) and ultimate tensile strength (UTS) of Samples 1-8 of Examples 1-8, as well as Samples C1-C12 of Comparative Examples C1-C12. A line corresponding to UTS·TE of 25,000 is roughly drawn in FIG. 15. As can be seen, the high strength steel sheet samples produced in accordance with the present invention possess superior combinations of strength and elongation versus the comparative samples, i.e., high total elongation properties at high UTS levels are observed for the inventive examples. The Sample 1 through Sample 8 steels fall into the category of Generation 3 advanced high strength steels, which are highly desirable for automotive and other industries.

Example 9

Mill trials were conducted for samples labeled M1-M5 in Table 3 below using either the CAL+CAL or CAL+CGL process. For Samples M1, M2 and M5, the CAL+CAL processing times and temperatures shown in FIG. 1 were used. For Samples M3 and M4, the CAL+CGL processing times and temperatures shown in FIG. 2 were used.

TABLE 3

Mill Trial Results

| Mil Trial No. | Process | C | Mn | Si | Other | Coat | YS (MPa) | UTS (MPa) | TE (%) | UTS * TE | Lambda |
|---|---|---|---|---|---|---|---|---|---|---|---|
| M1 | CAL + CAL | 0.22 | 1.4 | 1.4 | | None | 627 | 810 | 38.6 | 31266 | 61 |
| M2 | CAL + CAL | 0.185 | 2.2 | 1.4 | | None | 624 | 1009 | 25 | 25255 | 38 |
| M3 | CAL + CGL | 0.23 | 2.4 | 0.4 | 0.8Al, 0.02Ti, 0.02Nb | HDGI | 567 | 989 | 26.4 | 26110 | 24 |
| M4 | CAL + CGL | 0.22 | 2.3 | 0.4 | 0.8Al, 0.02Ti, 0.02Nb | HDGI | 655 | 941 | 30.9 | 29077 | 33 |
| M5 | CAL + CAL | 0.19 | 2.25 | 1.5 | | None | 635 | 1048 | 25.3 | 26514 | 29 |

Figure 16:
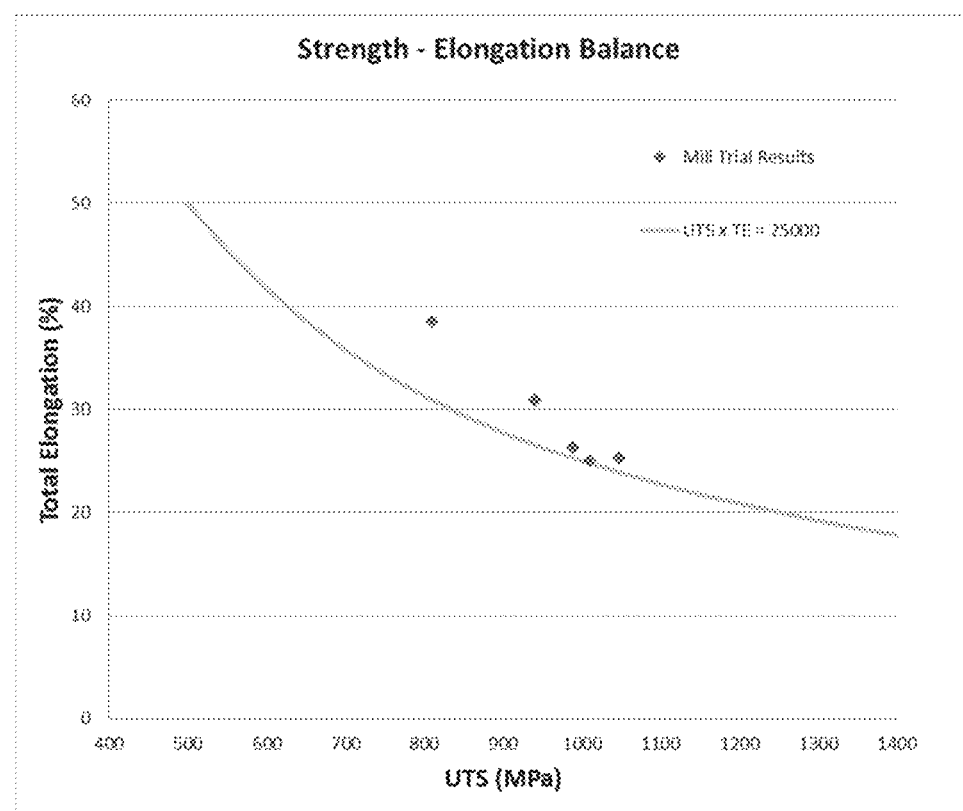
FIG. 16 is a graph of total elongation vs. ultimate tensile strength for high strength steel products produced in mill trials in accordance with embodiments of the present invention.

FIG. 16 shows the strength-elongation balance of the mill trial materials, all meeting a minimum UTS·TE of 25,000. The trial materials exhibited lambda values greater than 20%.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention.

What is claimed is:

1. A method of producing a high strength cold rolled steel sheet product comprising from 0.12 to 0.5 weight percent C, from 1 to 3 weight percent manganese, from 0.8 to 3 weight percent of a combination of Si and Al, balance Fe, the method comprising:
   subjecting the steel sheet product to a first step annealing process to achieve a predominantly martensitic microstructure; and subjecting the steel sheet product to a second step process comprising soaking the sheet product in an intercritical regime at a temperature of from 720 to 850° C., followed by holding the sheet product at a temperature of from 370 to 430° C., wherein the steel sheet product comprises ferrite and substantially equiaxed austenite grains, and has a combination of ultimate tensile strength and total elongation UTS·TE of greater than 27,000 MPa %.

2. The method of claim 1, wherein the first step annealing process is performed at a temperature above 820° C.

3. The method of claim 1, wherein the first step annealing process is performed at a temperature of from 830 to 940° C.

4. The method of claim 1, wherein the second step soaking process is performed at a temperature of from 720 to 850° C., and the second step holding process is performed at a temperature of from 360 to 440° C.

5. The method of claim 1, wherein the steel sheet product is cooled to a temperature below 300° C. between the first step process and the second step process.

6. The method of claim 1, wherein the steel sheet product is maintained at a temperature above 300° C. between the second step soaking process and the second step holding process.

7. The method of claim 1, wherein the first step annealing process is performed on a continuous annealing line, and the second step process is performed on a continuous annealing line.

8. The method of claim 7, wherein the same continuous annealing line is used for both the first step annealing process and the second step process.

9. The method of claim 7, wherein separate continuous annealing lines are used for the first step annealing process and the second step process.

10. The method of claim 1, wherein the first step annealing process is performed on a continuous annealing line, and the second step process is performed on a continuous galvanizing line.

11. The method of claim 1, further comprising electrolytically coating the steel sheet product with a zinc-based coating.

12. The method of claim 1, wherein the Si comprises up to 2 weight percent, the Al comprises up to 2 weight percent, and the steel sheet product further comprises up to 0.05 weight percent Ti, and up to 0.05 weight percent Nb.

13. The method of claim 12, wherein the C comprises from 0.15 to 0.4 weight percent, the Mn comprises from 1.3 to 2.5 weight percent, the Si comprises from 0.2 to 1.8 weight percent, the Al comprises up to 1.5 weight percent, the Ti comprises up to 0.03 weight percent, and the Nb comprises up to 0.03 weight percent.

14. The method of claim 12, wherein the C comprises from 0.17 to 0.35 weight percent, the Mn comprises from 1.5 to 2.3 weight percent, the Si comprises from 0.4 to 1.5 weight percent, the Al comprises up to 1 weight percent, the Ti comprises up to 0.02 weight percent and the Nb comprises up to 0.02 weight percent.

15. The method of claim 1, wherein the austenite has an average grain size of less than 10 microns.

16. The method of claim 15, wherein the austenite has an average grain size of less than 1 micron.

17. The method of claim 1, wherein the steel sheet product comprises less than 15 volume percent of fresh martensite.

18. The method of claim 1, wherein the steel sheet product has an ultimate tensile strength of from 720 to 1,100 MPa and has a total elongation of at least 20 percent.

19. The method of claim 1, wherein the steel sheet product has a hole expansion ratio of greater than 20 percent.

20. The method of claim 1, further comprising applying a zinc-based coating on the steel sheet product.

21. The method of claim 1, wherein the austenite comprises from 1 to 25 volume percent of the steel sheet product.

22. The method of claim 1, wherein the austenite comprises greater than 5 volume percent of the steel sheet product.

23. The method of claim 1, wherein the combination of ultimate tensile strength and total elongation UTS·TE is greater than 30,000 MPa %.

24. The method of claim 1, wherein the steel sheet product has a total elongation greater than 27 percent.

25. The method of claim 24, wherein the steel sheet product has an ultimate tensile strength greater than 750 MPa.

26. A method of producing a high strength cold rolled steel sheet product comprising from 0.12 to 0.5 weight percent C, from 1 to 3 weight percent manganese, from 0.8 to 3 weight percent of a combination of Si and Al, balance Fe, the method comprising:
    subjecting the steel sheet product to a first step annealing process to achieve a predominantly martensitic microstructure; and
    subjecting the steel sheet product to a second step process comprising soaking the sheet product in an intercritical regime at a temperature of from 720 to 850° C., followed by holding the sheet product at a temperature of from 370 to 430° C., wherein the steel sheet product comprises ferrite and substantially equiaxed austenite grains, and has a total elongation of greater than 27 percent.

* * * * *